(12) United States Patent
Nath

(10) Patent No.: US 9,710,506 B2
(45) Date of Patent: Jul. 18, 2017

(54) METHOD AND SYSTEM FOR PROVIDING STATISTICAL DATA FROM A DATA WAREHOUSE

(75) Inventor: Gourab Nath, Antibes (FR)

(73) Assignee: Amadeus S.A.S., Biot (FR)

( * ) Notice: Subject to any disclaimer, the term of this patent is extended or adjusted under 35 U.S.C. 154(b) by 770 days.

(21) Appl. No.: 13/979,699

(22) PCT Filed: Feb. 20, 2012

(86) PCT No.: PCT/EP2012/052872
§ 371 (c)(1),
(2), (4) Date: Nov. 20, 2013

(87) PCT Pub. No.: WO2012/113756
PCT Pub. Date: Aug. 30, 2012

(65) Prior Publication Data
US 2014/0074853 A1    Mar. 13, 2014

(30) Foreign Application Priority Data

Feb. 21, 2011  (EP) .................................... 11305177

(51) Int. Cl.
*G06F 7/00*       (2006.01)
*G06F 17/30*      (2006.01)
(52) U.S. Cl.
CPC .. *G06F 17/30327* (2013.01); *G06F 17/30457* (2013.01); *G06F 17/30592* (2013.01)
(58) Field of Classification Search
CPC ......... G06F 17/30457; G06F 17/30592; G06F 17/30702

(Continued)

(56) References Cited

U.S. PATENT DOCUMENTS

| 2003/0093424 A1 | 5/2003 | Chun et al. |
| 2004/0122844 A1 | 6/2004 | Malloy et al. |

(Continued)

FOREIGN PATENT DOCUMENTS

| CN | 1492336 | 4/2004 |
| CN | 101763415 | 6/2010 |

(Continued)

OTHER PUBLICATIONS

Joachim Hammer, Lixin Fu; CubiST++: Evaluating Ad-Hoc CUBE Queries Using Statistics Trees; Nov. 1, 2003.*

(Continued)

*Primary Examiner* — James Trujillo
*Assistant Examiner* — John J Morris
(74) *Attorney, Agent, or Firm* — Thompson Hine LLP

(57) ABSTRACT

Methods, systems, and computer program products for providing statistical data relating to a plurality of input files from a data warehouse. A plurality of bins are associated with a plurality of hierarchically ordered index fields. Each index field is associated with a parameter of the input files and is configured to accept an index field value from a predefined value domain associated with the index field. A lookup table is defined that includes a plurality of hierarchically indexed data structures and data containers storing statistical data for each index within the data structures. For each data structure, a primary key and at least one secondary key are formed by concatenating one or more bins in compliance with a hierarchy of the hierarchically ordered index fields to form a sequence of bins, The lookup table includes only one primary key per data structure.

22 Claims, 6 Drawing Sheets

(58) Field of Classification Search
USPC .............................. 707/999.002, 743, 999.1
See application file for complete search history.

(56) References Cited

U.S. PATENT DOCUMENTS

2005/0262108 A1* 11/2005 Gupta ............... G06F 17/30592
2008/0059418 A1* 3/2008 Barsness ........... G06F 17/30702

FOREIGN PATENT DOCUMENTS

| JP | H08-329101 | 12/1996 |
|----|------------|---------|
| JP | H11-232283 | 8/1999 |
| JP | 2008-130084 | 6/2008 |
| KR | 10-2001-0068047 | 7/2001 |
| KR | 10-2008-0002743 | 1/2008 |
| WO | 2006/065953 | 6/2006 |

OTHER PUBLICATIONS

T. Johnson and D. Shasha; Some Approaches to Index Design for Cube Forests; 1997.*

Japanese Patent Office, Office Action issued in corresponding Application No. 2013-553965 dated Jan. 25, 2016.

Hammer, Joachim et al.; "CubiST++: Evaluating Ad-Hoc CUBE Queries Using Statistics Trees"; Distributed and Parallel Databases, 14; pp. 221-254; Kluwer Academic Publishers, The Netherlands (2003).

KR, English Translation of Office Action; Korean Patent Application No. 10-2013-7023743; 6 pages (Mar. 17, 2016).

CN, Notification of the First Office Action (with English translation); Chinese Patent Application No. 201280009577.8; 54 pages (Mar. 9, 2016).

Hammer et al., "CubiST++: Evaluating Ad-Hoc CUBE Queries Using Statistics Trees", Distributed and Parallel Databases, Kluwer Academic Publishers, vol. 14, No. 3, Nov. 1, 2003.

Lixin et al., "CubiST", Proceedings of the 3rd ACM International Workshop on Data Warehousing and Olap, Jan. 1, 2000.

Riedewald et al., "pCube: Update-efficient online aggregation with progressive feedback and error bounds", 12th International Conference on Scientific and Statistical Database Management, Jul. 26-28, 2000.

Srivastava et al., "TBSAM: an access method for efficient processing of statistical queries", IEEE Transactions on Knowledge and Data Engineering, vol. 1, No. 4, Feb. 1, 1988.

European Patent Office, International Search Report issued in International application No. PCT/EP2012/052872 dated Mar. 30, 2012.

The State Intellectual Property Office of the People's Republic of China, Second Official Action issued in Application No. 201280009577.8 dated Nov. 11, 2016.

* cited by examiner

610

00054|C1EDBBA78138B33A67FE000000000002082075E800060001837DF7DF7DF7EBB670D··························
|79061525830529·|79061810144436···|1|29.05.2007|···|29.05.2007|·00000|·00000|·00000|TKTT|···|·00001|·
00001|7456924837049··|BEROP3981|01.06.2007|ADT|CA········|··········|·000000000008000.00000|KES|·
2|NBO|KE·  |KIS|KE· |KE·  ·  |KE·  ·  |·  0000006190|N|01AUG|V|V|·  000000000000120.96000|USD|·  2|OK|0··········
|·0234061380|2007-06-02-01.07.41.196815|¶
00054|C1EDBBA78138B33A67FE000000000002082075E800060001837DF7DF7DF7EBB670D··························
|79061525830529·|79061810144436···|2|29.05.2007|···|29.05.2007|·00000|·00000|·00000|TKTT|···|·00001|·
00001|7456924837049··|BEROP3981|01.06.2007|ADT|CA········|··········|·000000000008000.00000|KES|·2|KIS|KE·
|NBO|KE·|KE··|KE·|·0000006201|N|01AUG|V|V|·000000000000120.96000|USD|·2|OK|0··································|·
0234061380|2007-06-02-01.07.41.196815|¶
00054|C1EDBBA78138B33A67FE000000000002082075E800060001837DF7DF7DF7EBB670D·························|
|79061525830529·|79061810093415···|1|29.05.2007|···|29.05.2007|·00000|·00000|·00000|TKTT|···|·00001|·
00001|7456924837049··|BEROP3981|24.05.2007|ADT|CA········|··········|·000000000000025.00000|USD|·
2|NBO|KE·  |BJM|KE· |BI·  ·  |BI·  ·  |·  0000006190|N|24JUL|V|V|·  000000000000022.96000|USD|·  2|OK|0··········
|·0234061380|2007-06-02-01.07.41.196815|¶
00054|C1EDBBA78138B33A67FE000000000002082075E800060001837DF7DF7DF7EBB670D··························
|79061525830529·|79061810093415···|2|29.05.2007|···|29.05.2007|·00000|·00000|·00000|TKTT|···|·00001|·
00001|7456924837049··|BEROP3981|24.05.2007|ADT|CA········|··········|·000000000000025.00000|USD|·
2|BJM|KE·  |NBO|KE· |BI·  ·  |BI·  ·  |·  0000006201|N|28JUL|V|V|·  000000000000022.96000|USD|·  2|OK|0··········
|·0234061380|2007-06-02-01.07.41.196815|¶

620

621                                                625

```
79061810144436 NB0412123 NB0027 NB0027KIS NB0027KIS0 NBO KIS KE 2007-Jul-02 0 0 8000 KES
79061810093415 NB0412200 NB0126 NB0126BJM NB0126BJM0 NBO BJM BI 2007-Jul-01 1 0 25 USD
```

METHOD AND SYSTEM FOR PROVIDING STATISTICAL DATA FROM A DATA WAREHOUSE

FIELD OF THE INVENTION

The present invention relates generally to data warehouses and business intelligence in general and more specifically addresses the problem of expediting data retrieval to process in real time queries from a large repository of data in view of providing statistical data.

This invention is about special in-memory data structures that permit a significant speed up in the response time of statistical Online Analytical Processing (OLAP) queries over large volumes of data typically used in business intelligence.

BACKGROUND OF THE INVENTION

All large companies and corporations, in the course of conducting their business activities, need to gather and accumulate large amount of information on a daily basis. One solution universally adopted is to store this information under the form of databases, most commonly in a model of databases referred to as a relational database. For all practical purposes a relational database is a collection of tables, with defined relations between them, under the control of a specific relational database management system (RDBMS) and equipped with a structured query language (SQL) so that information can be stored, updated and retrieved efficiently. Other models exist like a hierarchical model. Whichever model is used, a collection of databases need to be further organized when the overall amount of data to store and organize grows significantly. Indeed, it is now common that terabytes (i.e.: $10^{12}$ bytes) of information data need to be stored, and contents made permanently and readily accessible, just to allow daily operations of those large companies; hence, the concept of data warehouse that has been developed since the 80's. Data warehouses and data marts are the repositories set up by any large organization to hold their strategic operational and business data. The way a warehouse is organized has much to do with business intelligence. The warehouse structure and tools devised to extract, transform and load data from/to the repository along with the presentation and reporting of the retrieved information are key to allow any thorough analysis of its contents so that all warehouse users can make informed decisions in spite of the huge amount of data that may have to be involved.

In the travel industry such a large organization that needs to store and organize large amounts of data is a typically an airline or a GDS, i.e.: a 'global distribution system'. A GDS is any of a few large travel service providers which support, on a world-wide basis, all the actors of the travel industry including airlines, hotel chains, car rental companies, traditional travel agencies, other online travel service providers, etc. Such a GDS is for example AMADEUS, a European travel service provider with headquarters in Madrid, Spain. GDS's have thus to keep track, from their large storing, computing and networking resources, of data regarding possibly millions of travelers, thousands of travel agencies and online service providers and tenths of airline and transportation companies. To this end, any GDS needs to set up numerous large databases holding such things as all the schedules of the transportation companies supported, the myriad of fares they provide that are updated on a daily basis, and all the ticketing data of millions of travelers.

Organization such as an airline or a GDS often needs to rely on statistics to define its strategy. Statistics may also be provided to end-users as a service that facilitates their purchases. Statistics often require analyzing huge amount of data spread in the numerous databases forming the data warehouse of an organization such as an airline or a GDS Yet, such analyze of huge amount of spread data is not an easy task. In spite of the fact that databases are specifically devised to facilitate the retrieving of data it remains that the analysis of the contents of a warehouse implicitly means that data from different databases, possibly involving many large tables, need to be cross-compared so meaningful pieces of information can be extracted and presented to the end user in response to such a query. Typically, with relational databases, this implies that join operations be performed on tables entries. These operations are known to be costly in term of processing resources and time to execute. Also, accessing multiple databases from possibly separate computerized platforms triggers numerous I/O (Input/Output) operations that are intrinsically much slower than if processing can be confined to a single internal computerized unit. And, all of this interferes with the regular production work of warehouse databases that need to be always operational and capable of handling simultaneously many users. This renders difficult, if not impossible, to process in real time, i.e. within an expected time frame of a few milliseconds to a few tenths of milliseconds, sophisticated queries that involve the fetching of large amounts of information like the gathering and computation of daily statistical data.

Thus, it is an object of the invention to disclose a data structure kept updated from a warehouse of databases and aimed at expediting the retrieval of statistical data so that even sophisticated queries can be processed and responded in real time in spite of the large amount of data possibly involved.

Further objects, features and advantages of the present invention will become apparent to the ones skilled in the art upon examination of the following description in reference to the accompanying drawings. It is intended that any additional advantages be incorporated herein.

SUMMARY OF THE INVENTION

To fulfill the above objectives the invention describes a method for providing statistical data from a data warehouse involving one or more data storage means and one or more processor coupled to the data storage means.

A glossary of terms and references used to describe the invention is provided below and before the brief description of the drawings.

The method is characterized in that it comprises the steps of:
  defining a plurality of index fields each index field accepting a plurality of index field values;
  creating a plurality of indexed files and hierarchically indexing the files as trees of indexes which includes, for each tree, the steps of:
    hierarchically ordering the index fields;
    defining bins, each bin being associated to an index field and gathering one or more index field values for that index field;
    creating indexes by concatenating one or more bins in compliance with the hierarchy of hierarchically ordered index fields to form a sequence of bins, an index comprising only one bin per index field;
    hierarchically indexing the files as trees of indexes, each index having zero or more children indexes or and having at most one parent index, so that each child index comprises the same sequence of bins as the index of its parent index plus at least an additional bin associated to an additional index field;

providing each index with a data container configured to store statistical data, so that each data container is indexed and is directly addressable from within the files hierarchically indexed;

receiving one or more input files comprised of raw data and updating the data containers with the input files, which includes for each input file using one or more processor arranged for performing the steps of:

identifying and extracting from the raw data at least one attribute to be analyzed through statistics and one or more input file parameters characterizing the attribute;

creating at least an individual record from the input file, each individual record comprising at least an attribute and the one or more input file parameters characterizing said attribute;

associating each input file parameter with at least an index field;

establishing a correspondence between each input file parameter and a bin of the at least one index field associated to that input file parameter;

identifying data containers indexed with the one or more bins that all correspond to an input file parameter of said individual record;

incrementally updating the identified data containers with the at least one attribute of said individual records to obtain statistical data describing the attribute.

Preferably, the method comprises an additional optional step of receiving a query and for each query using one or more processors programmed for:

identifying in the query one or more query field and at least one query field value associated to the query field;

establishing a correspondence between each query field and an index field;

establishing a correspondence between each query field value and a bin of each index field corresponding to said one or more identified query field defining thereby a set of bins corresponding to the query;

searching and identifying a relevant data container indexed with an index that comprises the set of bins corresponding to the query;

retrieving and sending to the user the statistical data of the identified relevant container.

Advantageously, statistical data relate to a frequency distribution or measures of a central tendency of the distribution or measures of the dispersion of the distribution. According to an advantageous example, statistical data are based on statistical data related to prices actually paid by travelers for transportation services.

In a particular embodiment related to transportation and more particularly to passenger transportation, the invention may comprise any one of the optional following features:

index fields are at least one of the following: city of origin, country of origin, geographical area of origin, city of destination, country of destination, geographical area of destination, cultural destination, sport activity, gastronomy, wildlife observation, entertainment, departure date by exact departure date, departure period by month, departure period by week, return date by exact date, return period by month, return period by week, duration of the trip after arrival, advance purchase category.

according to an embodiment, at least an index having no parent index is created by concatenating at least two bins. For instance, an index that has no parent index includes a bin associated to an index field related to the city of origin, a bin associated to an index field related to the duration of the trip before departure and a bin associated to an index field related to the week of departure of a flight. According to a specific use case, a bin gathers some index field values related to one of the following: cities of origin, cities of departure, departure dates, departure weeks, return dates, return weeks, number of days for trip duration, number of days for advance purchase.

according to another embodiment at least an index having no parent index comprises only one bin.

an input file is an electronic ticket of a transportation service and comprises at least a coupon embodying all information for a segment of the transportation.

the attribute is the price actually paid for each ticket or coupon. The input file parameters describe at last one of the following fields: city or origin, city of departure, departure date, return date, departure date, return date, trip duration, number or days between booking and departure.

a query field relates to at last one of the following fields: city of origin, country of origin, geographical area of origin, city of destination, country of destination, geographical area of destination, cultural destination, sport destination, gastronomy, wildlife observation, entertainment, departure date by exact departure date, departure period by month, departure period by week, return date by exact date, return period by month, return period by week, duration of the trip after arrival, number or days between booking and departure.

a single index field value can be associated to a plurality of index fields. For instance an index field value that describes a city of destination is associated to at least two of the following index fields: city of origin, country of origin, geographical area of origin, cultural destination, sport activity, gastronomy, wildlife observation, entertainment.

Optionally, the method according to the invention may include any one of the following features and steps:

creating individual records includes the steps of: assigning a date or week or month or semester or year to each individual record, the date corresponding to the reception of the input file; storing the individual record in data storage means.

updating the data containers with the individual records includes the steps of: creating batches of individual records having the same dates or having same date periods; updating the data containers by batch of individual records.

updating does not require computation of all previous records. Thus, a minimal computation is required. Typically, the statistics are updates at the end of each day after receiving all input files. It permits each day's transaction data to be seamlessly integrated into the range of data that should be available for use the next day, without undoing the computation that was made until the previous day.

preferably index field values and attributes are integer numbers, decimal numbers or intervals are updated with appropriate counts or new values.

The addition of a new individual record to a container involves minimal changes: just the count values in the respective frequency bins. Therefore, despite an enormous increase in the total number of individual records, container sizes and the file sizes does not increase much due to the frequency distribution representation that is used and to the incremental mechanism. No other data is added.

for maintaining accurate statistical data the invention may include the following steps: reading the dates of stored individual records; identifying prior individual records assigned with a date older than a given date; locating through the input file parameters of these identified prior individual records the data containers that were updated with these identified prior individual records; updating the located data container by deleting these identified prior individual records. More precisely, the data container is updated by incrementally deleting the located data containers with the attribute of the identified prior individual records. Deleting a record does not require computation of all previous records. Thus, a minimal computation is required to discard past data and maintain the statistics data relevant without discarding past computations.

incrementally updating the identified data containers comprises the step of incrementally computing updated statistical data from previously computed statistical data and from the at least one attribute of said individual records.

a data container is identified for an update by an input file in case said data container is indexed with a number of bins that is equal or inferior to the number of input file parameters and provided each of these one or more bins correspond to an input file parameter of said input file.

in case an input file parameter of an individual record is associated to an existing index field but does not correspond to any bin of this associated existing index field, then creating an additional bin for this associated existing index field; creating an additional data container indexed with this additional bin; updating the additional data container with said individual record.

For instance, in case there are data containers indexed with the indexes NBO and NBO05 and in case the input file parameters of the individual record corresponds to bins NBO, 05 and 40, then, the data container NBO0540 will be created. The attributes of that individual record will update the data containers indexed with the following indexes: NBO, NBO05 and the newly created NBO0540. Data containers indexed with NBO0532 and NBO0540 are at the same level of the tree of indexes.

each input file parameter of an individual record corresponds to a bin but there is a combination of one or more bins corresponding to said input file parameter that does not correspond to an index, then creating an additional data container indexed with this combination of one or more corresponding bins; updating the additional data container with said individual record.

For instance, in case there are data containers indexed with the indexes NBO and NBO05 and in case the input file parameters of the individual record corresponds to bins NBO, 05 and 32, then the following combination of bins does not correspond to an existing index: NBO 05 32. Then, the data container NBO0532 will be created. The attributes of that individual record will update the data containers indexed with the following indexes: NBO, NBO05 and the newly created NBO0532.

in case different entities such as GDS, airlines, travel agencies, need different indexes to the same or partially overlapping data, then indexes for each business entity are created and separate precomputations create different files over which queries can be made.

all data stored in data containers are stored under the form of flat files.

the query admits wildcard as query field value for one or more query field. Wildcard are designated "*" in the present invention. The wildcard means that only the * or the wildcard bin of the index field corresponding to that query field is searched. Therefore, for a query with the query field values NBO, *, 32, the invention locates all containers having indexes with bins NBO and 32 for the first and third index fields and the * or wildcard bin of the second index. This is one of the reasons for query speedup. Searching all bins response would have been slow. By aggregating search combinations at data transformation time a massive computation time is saved during lookup time.

The query admits a wildcard query field value for one or more query field, and the wildcard query field value means that the statistics corresponding to a wildcard bin for that index field will be searched. More precisely, the method comprises the steps of creating indexes through forming a sequence of one or more bins, at least one of these bins accepting all index field values for index field. Such bin is called a wildcard bin. Therefore, the invention automatically creates additional indexes and data containers with indexes less specific.

Consider one index from our system e.g. NCE 01 52: it is the index for the grouped details of all trips that were booked from NCE with a trip type of 01 and on the 52nd week of the year. Similarly NCE 06 02: is the index for the grouped details of all trips that were booked from NCE with a trip type of 6 and on the 02nd week of the year. The invention creates wildcard indexes during the indexing process. The following indexes are created for instance: NCE*52: is the index for the grouped details of all trips of any trip type that were booked from NCE on the 52nd week of the year; NCE2: is the index for the grouped details of all trips of type 2 that were booked from NCE on any of the 52 weeks of the year; NCE*: is the index for the grouped details of all trips of any trip type that were booked from NCE on any of the 52 weeks of the year. The star also designated wildcard indicates that all index field values are accepted. The wildcard could also be represented by the index value "all>>. Semantically it means that NCE***, includes all of the records for each NCE xx DD where xx is any given value for the second index field (e.g.; trip type) and DD is any given for the third index field (e.g. week number of the year). This feature allows retrieving responses to large scale queries in constant time.

Another subject matter of the present invention is a method of retrieving statistical data from a data warehouse populated according to the above mentioned method and involving one or more processor characterized in that it comprises the steps of:

identifying in the query one or more query field and at least one query field value associated to the query field;

establishing a correspondence between each query field and an index field;

establishing a correspondence between each query field value and a bin of each index field corresponding to said one or more identified query field defining thereby a set of bins corresponding to the query;

searching and identifying a relevant data container indexed with an index that comprises the set of bins corresponding to the query;

retrieving and sending to the user the statistical data of the identified relevant container.

Another object of the present invention is a method and a system for gathering statistical data from a data warehouse comprising one or more databases, wherein the gathered statistical data are held in a plurality of indexed flat files, the method characterized in that it comprises the steps of: gathering the statistical data into category bins; incrementally updating the category bins; hierarchically indexing the flat files as trees of indexes; defining a primary index at root of each tree of indexes; addressing directly from indexes either a container of statistical data or another index. Optionally, the method and the system comprise at least any one of the facultative features and steps:

The indexed flat files are imported and kept resident into the main memory of a computerized serving platform.

The queries from end-users are exhaustively served from the plurality of indexed flat files kept resident in the main memory of the computerized serving platform.

The statistical data are gathered at scheduled intervals from the data warehouse.

The statistical data are actual fare prices paid by travelers to be transported on airline flights.

The category bins are: an origin of a flight, a destination of a flight, a trip type, a start week and an advance purchase category.

The primary index includes the origin, the trip type and the start week of a flight.

The flat file indexes include the destination of a flight and the advance purchase category.

Indexes comprise at least a wildcard character.

Another object of the invention is a computer program product stored on a non-transitory computer readable storage medium, comprising computer readable code means instructed for causing at least one microprocessor to operate the method for providing statistical data according to any one of the previously described steps.

Preferably, the computer program product is provided through an on-line web site.

Another object of the present invention relates to a system for creating statistical data in a data warehouse comprising processing means and one or more data storage means coupled to the processing means. The system is characterized in that the data storage means and the processing means are arranged to carry out the following steps of:

defining a plurality of index fields each index field accepting a plurality of index field values;

creating a plurality of indexed files and hierarchically indexing the files as trees of indexes which includes, for each tree, the steps of: hierarchically ordering the index fields; defining bins, each bin being associated to an index field and gathering one or more index field values for that index field; creating indexes by concatenating one or more bins in compliance with the hierarchy of hierarchically ordered index fields to form a sequence of bins, an index comprising only one bin per index field; hierarchically indexing the files as trees of indexes, each index having zero or more children indexes or and having at most one parent index, so that each child index comprises the same sequence of bins as the index of its parent index plus at least an additional bin associated to an additional index field;

providing each index with a data container configured to store statistical data, so that each data container is indexed and is directly addressable from within the files hierarchically indexed;

receiving one or more input files comprised of raw data and updating the data containers with the input files, which includes for each input file using one or more processor arranged for performing the steps of: identifying and extracting from the raw data at least one attribute to be analyzed through statistics and one or more input file parameters characterizing the attribute; creating at least an individual record from the input file, each individual record comprising at least an attribute and the one or more input file parameters characterizing said attribute; associating each input file parameter with at least an index field; establishing a correspondence between each input file parameter and a bin of the at least one index field associated to that input file parameter; identifying data containers indexed with the one or more bins that all correspond to an input file parameter of said individual record; incrementally updating the identified data containers with the at least one attribute of said individual records to obtain statistical data describing the attribute.

Preferably, the system also comprises means for receiving a query and configured to perform the following steps for each query using through one or more processors programmed for: identifying in the query one or more query field and at least one query field value associated to the query field; establishing a correspondence between each query field and an index field; establishing a correspondence between each query field value and a bin of each index field corresponding to said one or more identified query field defining thereby a set of bins corresponding to the query; searching and identifying a relevant data container indexed with an index that comprises the set of bins corresponding to the query; retrieving and sending to the user the statistical data of the identified relevant container, thereby, allowing a retrieval of statistical data in response to a end-user query, independently of the volume of data involved, and within an elapsed time in the order of a small number of milliseconds.

The invention thereby allows responding in a very short time to sophisticated queries i.e. queries that involve the fetching of huge amounts of information like the gathering and computation of daily statistical data.

Another object of the invention is a computer program product stored on a non-transitory computer readable storage medium, comprising computer readable code means instructed for causing at least one microprocessor to operate the method for providing statistical data according to any one of the previously described steps.

The various features of the invention will be detailed below through explanations and definitions.

Statistical Data

The invention provides a system to create, store, incrementally update and retrieve statistical data computed from a large number of raw data. For a given variable these statistical data may for instance relate to a frequency distribution; measures of a central tendency of the distribution e.g. mean or median; measures of dispersion of the distribution e.g. standard deviation; nature of the distribution itself as identified by percentiles/quantiles etc.

Such statistical data are not limitative. The nature of the data to be studied through statistics is also not limitative.

A typical example concerns statistics concerning the price of any given product or service on sale or paid by customers. A particularly advantageous application of the invention concerns statistical data concerning the price of transport ticket actually paid by passengers.

Indexes, Index Fields, Index Field Values and Bins

An index field (IF) is a parameter that is relevant to characterize the statistics of another parameter to be analyzed. For instance, for statistical data related to the price of a travel, index fields may be related to: origin of the travel (e.g. index field='city', 'country', 'geographical area' etc.); destination of the travel in term of location (e.g. index field='city', 'country', 'geographical area') and/or in term of thematic destination (e.g. index field='cultural destination', 'sportive destination', 'gastronomic destination', 'wildlife observation', 'entertainment' etc.); departure date (e.g. index field='exact departure date') or 'departure period' (e.g. index field='exact departure date', 'month of departure', 'week of departure'); return date (e.g. index field='exact return date') or 'return period' (specific month or week or weekend) or 'trip type category' (duration of the trip after arrival), 'booking date' or 'booking period', 'advance purchase category' (time period between booking and departure). Index fields listed below and in the described examples are chosen for sake of understanding but are not limitative.

The value of an index field (IFV) is the value that an index field can be assigned from within a predefined value domain. The value can be a numeral (number of days) or an alphanumeric code that represents a certain entity or a collection of them (e.g. an airport or a city or a destination theme). An index field value will usually be of pre-decided designated fixed length. For instance, when analyzing statistics concerning the price of a travel coupon:

- the index field value for the index field 'origin' may be one of the following: Nairobi (city of origin), Kenya (country of origin), Africa (geographical area).
- the index field value for the index fields 'city of destination', 'geographical area', 'wildlife observation', 'railway museums' that relate to the objective of the travel may be 'Nairobi' for instance. Thus, it appears clearly that one single index field value can be associated to a plurality of index fields.
- the index field value for the index fields 'exact date of departure', 'week of departure', 'month of departure' that relate to the departure date may be '14 Jun. 2007'.
- the index field value for the index field 'trip type category' or 'trip duration' may be one of the following: 1 day, 3 days, 2 weeks, 1 month and 3 days etc.
- the index field value for the index field 'advance purchase category' may be one of the following: 1 day, 3 days, 2 weeks, 1 month etc.
- the index field value could be a wild card designated by repeating *'s of appropriate fixed length. This is like a catch-all index value, whose meaning corresponds to the don't-care symbol typical in computing.

A bin mathematically represents the domain within which the value of an index field is guaranteed to be assigned within. The label assigned to a bin appears as the index field value to an index field and corresponds to this length. This is also true even if the index field value corresponds to a collection but then the meaning of that label is no more a single entity but represents a discrete collection of values or continuous set that may be denoted by the extremities of a numeric range. For instance, the index field 'departure period by month' can have its domain defined discretely as integers within the range 1-12, 12 bins, that will coarsely classify every date in the year into one bin label that lies between 1 and 12.

Similarly the index fields 'wildlife observation' or 'thematic destination' can have a bin 'safari' that corresponds to cities that are good start points for safaris. The bin 'safari' can gather the index field values 'Nairobi', 'Mara Serena', 'Gaborone' and other cities located near national parks famous for their safaris etc.

Input File, Records, Attributes, Data Containers

An input file is a file that is received by the system and that contains the original data set, raw data, to be analyzed by the system. The system analyses the input file and retains, deletes or transforms attributes of records in it into appropriate index field values that corresponds to a predefined collection of index fields that is relevant for associating with the parameter whose statistics are to be provided by the system as a result in response to a query. All data in the input file are designated as raw data before they are analyzed.

In the original dataset (raw data) a record is nothing but a tuple of attributes, from which a set of index field values or the parameter whose statistics we want to know can be defined and then computed. For example, if we decide to model origin and destination as the only index fields that affect the parameter called flight price—the input data source files could be either coupons or tickets. We can imagine that each coupon is a record just like a row in a table or spreadsheet, where the column headers of the table correspond to many attributes like origin, destination, departure date, ticketing date, PNR date, cabin class, fare class etc—some of which are chosen to be the index fields, e.g. origin, destination of interest to index a given parameter, e.g. price, whose statistics we are interested in. A transformation process operates over the attribute values on the original data set to arrive at transformed index field values of the chosen index fields. For example, if number of days to departure is chosen to be an index field then the transformation process utilizes the original data set attributes called departure date and PNR date (or ticketing date) to arrive at the value of the "number of days to departure" index field as departure date—PNR date or as Departure date—Ticketing date.

Note that in the transformed data set, the notion of a record is different. In the repository of transformed records, each record is a path within a tree of indices. Many records in the original data set map to a single record in the transformed data set. As an example, consider, that we are interested in price statistics as the principal investigation parameter and that we have decided that we will model origin and destination as the principal determinants of price. Now if the first level index field is an origin airport, due to huge numbers of several origin airports encountered in each of the coupons being parsed, multiple index values branch out as index field values for each origin airport. If the second level is the destination airport then multiple index field values branch out for each destination airport for a given origin airport, resulting in a 2 level tree. And finally for each origin-destination index pair, there are multiple prices possible. Thus multiple prices branch out from each destination node resulting in the third level of the tree. For each every unique origin-destination-price triple or a path in this tree there is a frequency count resulting in the 4th level in the tree. However notice that the relation between each tree node in the 3rd level and each node in the 4th level is one to one, unlike the relation in the higher levels of the tree which is one to many. The price-frequency count pair for an index path in that tree is called the "data container"—in effect it stores a distribution of different prices of all original records that have the same index field values, e.g. NCE-NYC, as the origin-destination city. The (origin, destination collection) pair and the (destination, price collection) pair are termed as 'index container'. In general any arbitrary path in the tree starting at the root that is complete (up to the leaf) or incomplete (not up to the leaf) is in general referred to as a container.

Queries

Query Fields and Query Field Values

A query is filled and sent by a user to obtain statistics related to the data to be statistically analyzed. The query may comprise one or more search criteria designated "query field value" in the present invention. A query may be very complex when comprising a large number of query field values or basic when comprising one or few query field values.

Query fields are parameters that characterize the query. Each query field value relates to a query field. Each query field corresponds to an index field. When there is no index field that corresponds to a query field value, optional steps are conducted. These optional steps are detailed below.

A given query field value corresponds to a bin of the index field corresponding to the query field of the given query field value. By 'corresponds' it is meant that the query field value may be similar to an index field value (real value or descriptive value), may be comprised in a bin of the index field or may be equal to a bin of the index field. In whatever form or shape a query interface may accept user input, that input must be transformed into a string of query field values, by first transforming exact inputs into appropriate bin values of the index fields that are exactly in the same order of indices that was used to create the transformed data set for itself.

For instance, if there is a transformed data repository that was indexed by 2 index field values, the first one being a compound type comprising of a concatenation of origin, trip type and start week and the second level index was the destination city then a query that is "What is the frequency distribution of prices actually paid by travelers for travels from Dubai to Nairobi with a departure date of August 4 and for a 25-day trip duration ?" will be answered by first transforming the user input into a string like DBX532 as the index field value for the first index, getting the corresponding container for the next index, searching for the second index NBO within the retrieved index progressively in order to get to the final data container.

Thus, advantageous features of the invention are:
Store, index and reason over groups of records (i.e. business relevant containers) instead of individual records. As opposed to what is done in conventional databases, the invention has the ability to store, index, retrieve and reason over groups of records without having to store the individual atomic records.
No computing of container index or contents is performed at query time. All is pre-computed. At query time, only the relevant record is searched and either found or not found. All indexes, recursive and non-recursive contents to each container are pre-computed, based on whichever fields of the individual records are important for a particular business need. At query time only the statistics data container corresponding to the right record is retrieved.
If different business users need different indexes to the same or partially overlapping data then separate pre-computations create different files and then different indexation of repositories over which queries can be made.
The indexes serve as the keys to address a massive in memory indexed table for fast retrieval: RAM (Random Access Memory) resident group record data permits fast retrieval thus overcoming slow modern day I/O machinery compared to the RAM machinery. To achieve this, file sizes are kept within acceptable limits as explained in the following description of the invention.
The indexes are combinatorial with one of the values of a given indexing variable being the wildcard character * whose meaning is "don't care". In relational database terms this means pre-computing the results for all possible joins of relevant tables.
An incremental mechanism for updating the containers when new individual records need to be added or old individual records need to be deleted without discarding past computation. When a new individual record needs to be added, its corresponding indexes are created and searched for. If such indexes are found then the statistics corresponding to parameter are updated. Ordinal or interval values are just updated with appropriate counts or new values. If the new individual record does not have a corresponding indexed container then its corresponding indexes are created and contents updated.
A mechanism to create, store and incrementally update statistical price distributions by all criteria relevant to a business need using the above mechanisms. Despite an enormous increase in the total number of individual records, container sizes and the file sizes does not increase much due to the frequency distribution representation that is used. With the addition of a new individual record to a container all that is changed is minimal: just the count values in the respective frequency bins. No other data is added. This keeps file sizes in control.

BRIEF DESCRIPTION OF THE DRAWINGS

FIG. 6 discusses the incremental updating of the indexed files from the incoming raw data.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Although the detailed description of the invention that follows is illustrated in the context of a GDS involving travel data, and more particular airline flights and fares, it will become apparent to the one skilled in the art of information systems that the invention can be easily adapted to process any kind of data so that it is not restricted to applications in the field of airline travel services.

Figure 1:
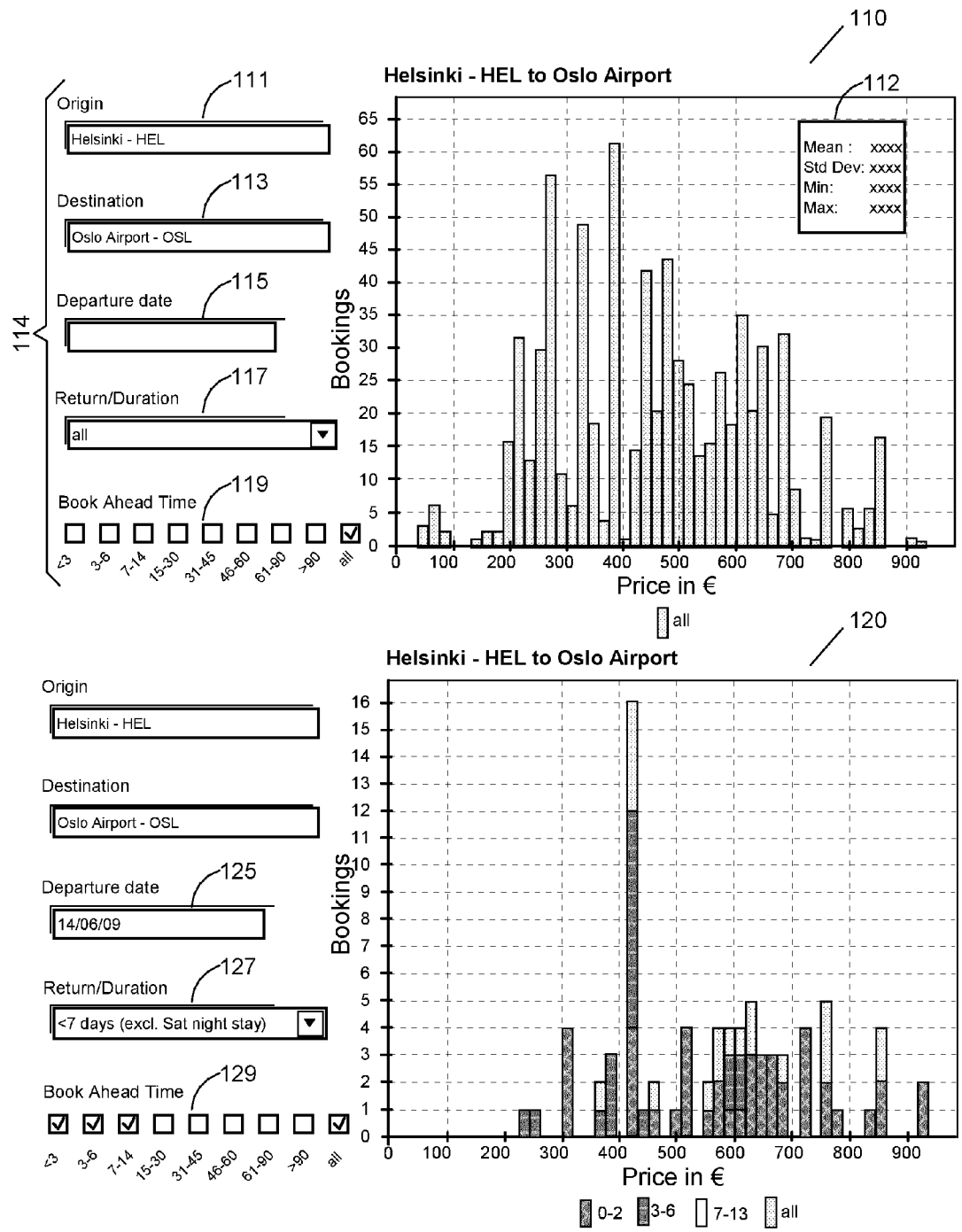
FIG. 1 illustrates an exemplary result of the kind of queries that are intended to be processed in real time from the data structure of the invention.

FIG. 1 illustrates an exemplary result of the kind of queries that are intended to be processed in real time from the data structure of the invention. FIG. 1 also illustrates an example of a display of statistical data provided in response to this kind of queries.

The queries allowed by the data structure of the invention are indeed very different from those issued to regular relational data base (e.g., SQL queries). They mainly differ in that they do not imply any post processing that would be otherwise required because, to obtain the exemplary display of FIG. 1, individual items of many relational database tables would have to be gathered and processed instead.

To run any large company the management team and professionals in charge typically need to gather statistical data whose pieces must possibly be assembled from various databases of their data warehouse and kept updated on a daily basis. In the context in which the invention is described, the airline industry, number of bookings and actual prices paid by passengers for flights from a given origin to a given destination correspond to the kind of requests that a professional is willing to display in real time from a software application implementing the data structure of the invention.

Hence, as shown 110, one may want to display, e.g., all the bookings done and paid between city of Helsinki, Finland 111 and Oslo airport, Norway 112 on any departure date 115 (entry field is empty) and for all return dates or trip durations booked 117. The fields (114): origin, destination, departure date, return/duration and book-ahead time each constitutes a query-able field. The values are either descriptive textual codes or numerals as defined previously. An important parameter of interest for the travel industry is the book-ahead or advance purchase time 119 that are arranged in eight bins as shown. All are considered in this exemplary display so that the bar graph 110 shows the frequency of occurrences versus the prices of actual bookings registered and paid between the origin and destination airline cities specified. Obviously, all standard statistical numbers characterizing this distribution can be computed and displayed 112 as well, including: mean value, standard deviation, min and max values, etc.

The user may want to further refine the display to show only the departures on a certain date 125, considering only a certain type of trip duration 127 and for book-ahead times of two weeks or less so that the bar graph displayed becomes as shown 120.

To be able to display and update this kind of query in real time the data structure of the invention, described in details in the following figures, must pre-fetch, compute and organize the data structure from the data warehouse so that all necessary pieces are readily available to be quickly displayed when queried. In the context of the description used to illustrate the invention, the airline travel industry, and for the exemplary kind of sophisticated requests shown 110, the data structure is organized so that all airlines cities and airport around the world are possibly supported providing also direct entries in the data structure to allow the display of the other chosen parameters like the departure dates, trip durations, book-ahead times, etc. Additionally, wildcard parameters are possible so that the user has the freedom of not specifying certain parameters like the departure date. The data structure offers the possibility of including, for example, generic origins and destinations so that the user may want to see the bookings of all the flights from, say, a precise origin, e.g., Helsinki to a certain region of the world, say, all the cities and airports in North America.

The data structure of the invention can be used as well by the end-user of travel applications that would be made available online to allow travel forecasting. Since the data used are actual prices, extracted from GDS databases, thus paid by travelers for booking flights, their gathering and display as shown in FIG. 1 becomes a very valuable tool. Tool that can be used to estimate the price of a future trip and determine choices of a traveler taking advantage of the features mentioned above. For example, the possibility of not to have to select precise dates and/or not to have to select a precise origin or destination add a large degree of freedom to today travel sites.

Indeed, these latter generally only consider published fares, and even more often only the lowest published fares, irrespective of availability and just ignoring the range and distribution of actual prices paid by the travelers. Moreover, the data structure can be augmented so that origin and destination include, e.g., thematic destinations that may have nothing in common as far as geography is concerned. Such a theme could be, for example, the ancient civilizations that would include the pyramids of Egypt and the ones of pre-Columbian people in Mexico and Latin America. As defined above, the ancient civilizations could correspond to a dedicated index field value and a query field value.

As further explained in the following description of the invention the retrieval process to display statistical results in response to a query of the kind discussed above is nearly independent of the volume of data involved and is in the order of a small number of milliseconds. Similar response times are guaranteed even for queries relating to ad-hoc parametric subsets of the distribution and display allows easy visual comparison of the sub-distribution sets in user selectable ways.

Figure 2:
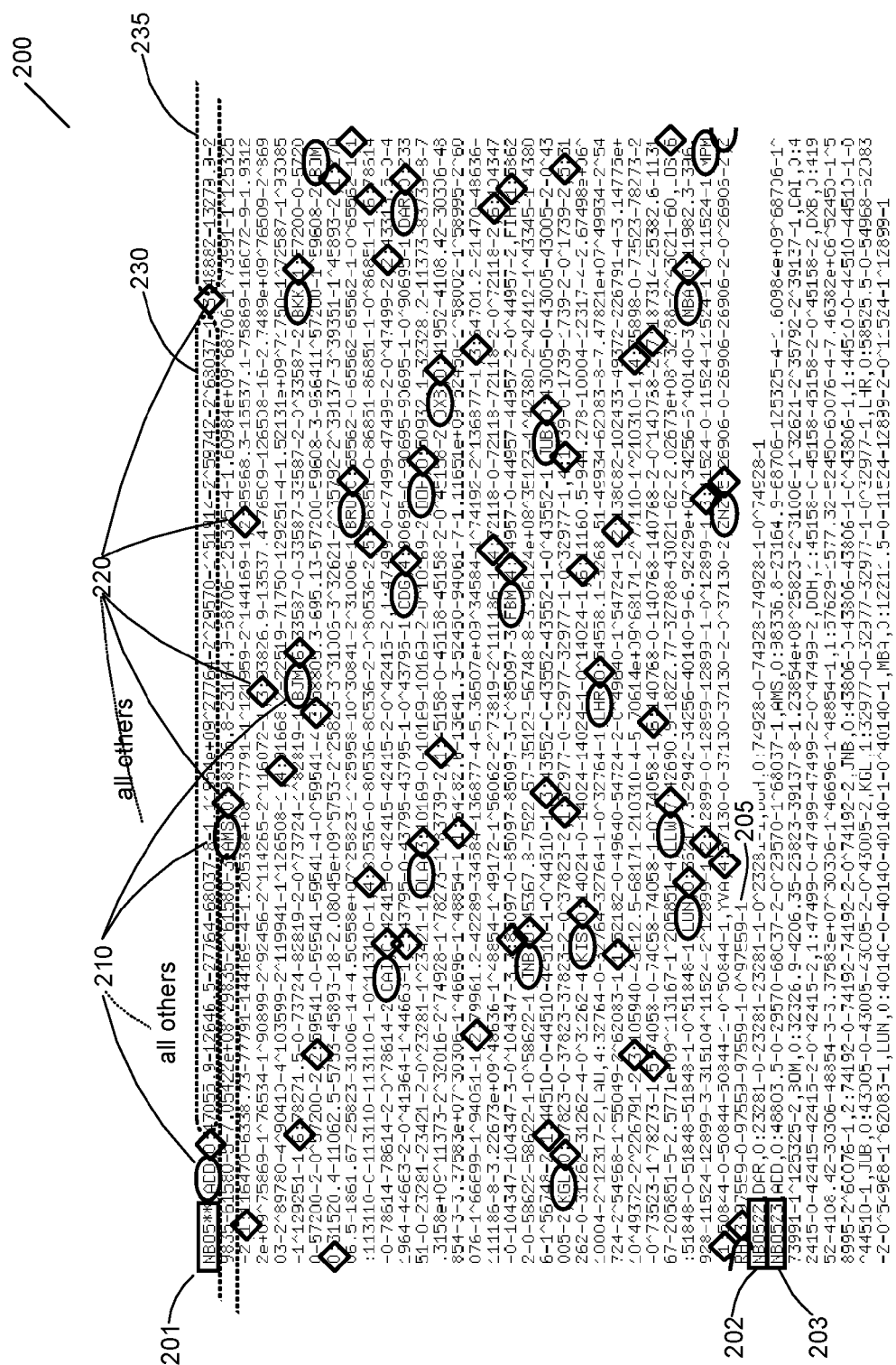
FIG. 2 describes how data pre-fetched from the warehouse databases are organized to allow a real time access to the stored information.

FIG. 2 describes how data pre-fetched from the warehouse databases are organized to allow a real time access to the stored information.

To achieve this objective a compression of the pre-fetched data records is performed by regrouping them in a finite number of data categories, designated bins in the present description and best adapted for the type of business considered, i.e., the airline industry in the example chosen to illustrate the invention. The pre-fetched data consists then in retrieving from the warehouse all the ticketing data records or coupons (in reference to the printed ticket coupon which is now dematerialized) that are daily issued through various selling channels including the travel agencies, the online travel service providers and the airline offices themselves. Altogether, when accumulated over a significant period of time, e.g., one year, this represents a huge amount of information which is however compressed in the data structure using following bins.

The advance purchase date is a very significant parameter for the travel industry. They are traditionally regrouped in only 8 standard bins as follows:

| Bin: | Advance Purchase: |
| --- | --- |
| 0 | <3 days |
| 1 | 3-6 days |
| 2 | 7-14 days |
| 3 | 15-30 days |
| 4 | 31-45 days |
| 5 | 46-60 days |
| 6 | 61-90 days |
| 7 | >90 days |

Another compression step is achieved by regrouping trip types in also 8 standard bins as illustrated below. This permits a vast collapse of data space from a 365*364 dimension considering every day of the year as departure or arrival to an 8 dimensional data space.

| Bin: | Trip Type: |
|---|---|
| 0 | Same day return |
| 1 | <1 week + Saturday night stay |
| 2 | <1 week + no Saturday night stay |
| 3 | 1 week |
| 4 | 2-3 weeks |
| 5 | 1 month |
| 6 | 2-3 months |
| 7 | >3 months |

A third compression step is obtained by considering only the 52 weeks of a year for the departure dates instead of individual days so that each weekday falls into one of the 52 week bins of the year. Thus a 365 dimension data space is compressed to a 52 dimension space.

No specific compression is attempted for the origin and destination pairs in this example however this doesn't limit the invention. The invention can be extended to more inclusive bins labeled "Asia", "America" etc that encapsulates a plurality of destination airports. Although thousands of airports exist around the world not all pair combinations need to be considered in practice and, anyway, coupon ticketing can only be issued for airport pairs that have actually flights operated between them. This drastically reduces the number of combinations to consider.

The next step is to define the primary index or entry key for the data structure. The way the primary key is structured is adapted to the context in which the invention is described, i.e., the airline industry. Other arrangements are obviously possible. In this example the primary key is a first level index obtained by concatenating:

- the origin of the flight ($1^{st}$ index field) using the regular 3-letter IATA (international air transportation association code) for airport and city codes.
- the reference of the trip type ($2^{nd}$ index field), a single digit number of the corresponding bin in the range 0-7, as shown above.
- the departing week ($3^{rd}$ index field), a two-digit number in the range 1-52.

Examples of primary keys used to index the data structure are:

| | |
|---|---|
| NCE152 | Index for all flights actually booked from NICE, France (NCE) of trip type 1 departing during the $52^{nd}$ (last) week of the year considered |
| NCE602 | Same as above, for trip type 6 departing in the $2^{nd}$ week of the year considered |
| NCE*52 | Index as above for any trip type departing from NICE during the last week of the year. Uses the wildcard character*. |
| NCE2** | Index as above for trip type 2 departing from NCE during any of the 52 weeks of the year. Uses the wildcard character*. |
| NCE*** | Index of all flights actually booked and departing from NICE. Any trip type, any week. Uses the wildcard character*. |

The primary key is the main entry key to address a lookup table taking the form of a flat file of text strings, possibly very long strings, each holding in a compressed way the computed statistical data computed from the raw data pre-fetched from the warehouse and matching this primary key, an example of which is shown in FIG. 2.

At this point it is worth noting that compression algorithms could be used to further compress the text strings and reduce the storage requirements so that even the largest data structures can be entirely held in the main memory of a computer guaranteeing a very fast access to any of the entry keys.

In this example 200 there are three primary keys shown: 201, 202 and 203. The first one is a primary key with wildcard characters in the week index field. This primary key thus regroups statistical data of all flights of type 5 departing from Nairobi, Kenya (NBO) during any week of the year. The text string is thus pretty long. It ends as shown 205.

Figure 3:
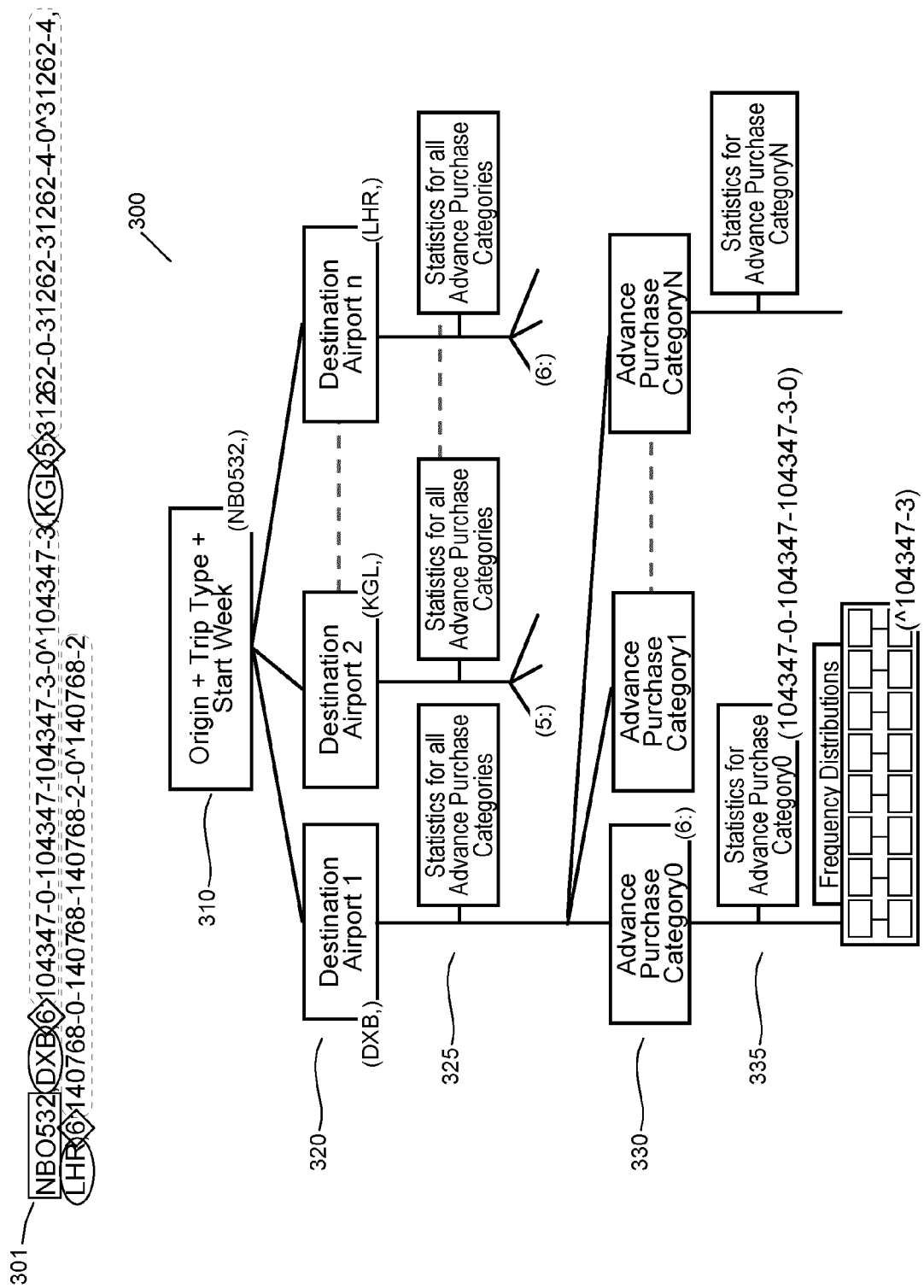
FIG. 3 shows how the entry keys are remembered and organized to allow a fast access to the computed statistical data of the data structure.

Each string contains secondary keys that define the boundaries of the computed statistical data per destination and advance purchase or book-ahead bins so that they can be addressed directly after the index of the corresponding key within the string have been retrieved as explained in FIG. 3 hereafter. All the second level keys of string 201 are shown 210. They represent all the destinations for which flight bookings have been retrieved from the data warehouse for the corresponding primary key 201. Like for the origin, destinations cities and airports are represented by their 3-letter IATA code. Each three letter IATA code is an index field value of the index field 'city of origin'.

A third level indexing is done with the advance purchase bin codes previously defined, i.e.: a number between 0 and 7 as shown 220. The computed statistical data are held in containers like 230 bounded by any two keys.

FIG. 3 shows how the entry keys are remembered and organized to allow a fast access to the computed statistical data of the data structure.

Each primary key is at the root of a search tree 300. The tree is exemplified with the simple text string 301. The primary index, the first level key 310, is then NBO532 meaning that this lookup table entry is indexing all flights from NBO (Nairobi, Kenya) that were of trip type 5 for a departing date that belonged to the $32^{nd}$ week of the year as previously explained. A primary index of a tree is a parent index for all the indexes of this tree.

Within this lookup table entry there are, in this example, three containers that are indexed by the destination airports, i.e., by the second level keys 320 previously defined; namely, DXB (Dubai, United Arab Emirates), KGL (Kigali, Rwanda) and LHR (London, United Kingdom). Each of the indexes with destination airports is a child index for the primary index. More generally and as usually admitted in this technical filed, for a given index of a tree, a parent index is an index of that tree that is closer to the root of the tree than the given index. For said given index, a child index is an index of that tree that is farther to the root of the tree than the given index. A given index can possibly have a plurality of parent indexes and a plurality of child indexes.

If statistics had been computed for all advance purchase categories, they would have been inserted at this point 325 in the data structure of the invention. The contents of the corresponding data container could thus be opened to give access to statistics on all trips from Nairobi to Dubai, irrespective of the purchase categories to which they belong.

Otherwise, each advance purchase category is addressed separately with the third level keys 330. For the first destination airport of this example, i.e.: DXB, the third level key is the bin code 6 which indicates the statistics for this advance purchase bin. The statistics for this container 335 is the data block: 104347-0-104347-104347-3-0; and the frequency distribution for this data is 104347-3. These numbers are values of the states of statistical parameters up to the $n^{th}$ row computed and correspond to $M_n$, $V_n$, $S_n$, appearing in the formulas later as well as some other incremental states that are used to compute $M_{n+1}$, $V_{n+1}$, $S_{n+1}$.

In the general case, for a given destination, multiple advance purchase bins are present. Then, the same format 335 is repeated for each of the advance purchase or book-ahead bins. For example, in the data structure of FIG. 2, for the second level key AMS (Amsterdam, Netherlands) 210 five third level keys 220 are defined, namely: 0, 1, 2, 3, 4 and 6; each holding its own set of statistical data.

A series of key trees (one per primary key), like the one shown 300, is generally the most convenient structure used to allow a fast retrieving of the entry keys so that containers within the multidimensional lookup table can be addressed directly thus retrieved in close to constant time. Other organisational structures could however be considered as well including a graph or a network of nodes.

The multidimensional data structure described in FIGS. 2 and 3 enables efficient search oriented indexed storage of data important to groups of industry users. It thus allows the processing of sophisticated queries such as:

| Question: | Query: |
|---|---|
| What is the typical weekend fare of a trip between NCE (NICE) and CDG (PARIS, CDG Airport) on the 32nd week of the year with a 30 day book ahead time? | Origin + trip-type + start-week[NCE232]; destination[CDG]; bookahead[4] |
| What is the typical weekend fare of a trip between NCE and CDG on the 32nd week of the year? | Origin + trip-type + start-week[NCE232]; destination[CDG]; bookahead[*] |
| What is the typical weekend fare of different destinations from NCE on the 32nd week of the year? | Origin + trip-type + start-week[NCE232]; destination[*]; bookahead[*] |
| What is the typical weekend fare between NCE and CDG with a 30 day book ahead time? | Origin + trip-type + start-week[NCE2**]; destination[*]; bookahead[4] |
| What places can I go from NCE for the weekend and at what prices? | Origin + trip-type + start-week[NCE2**]; destination[*]; bookahead[4] |
| What are the last minute booking prices between NCE and CDG on the 32nd week of the year? | Origin + trip-type + start-week[NCE2**]; destination[CDG]; bookahead[1] |
| What are the prices to any destinations from NCE on the 32nd week of the year? | Origin + trip-type + start-week[NCE*32]; destination[*]; bookahead[*] |
| Where can I go from NCE? | Origin + trip-type + start-week[NCE***]; destination[*]; bookahead[*] |

Indexes are used as the primary keys to RAM (random access memory) resident embedded indexed tables Indexed tables are used because they are known fast methods of randomly accessing indexed storage. They permit constant time or near constant time or, at worse, logarithmic time access like a random access to an array in a conventional programming language like C, C++ for example. This significantly contributes to the invention speed.

In addition, the invention embodies a memory-CPU bus which also contributes to the speed of statistical data processing and retrieval.

An index, like NBO532 for instance, could be visualized and implemented using various different methods according to the invention.

According to a first method, an index can be visualized and treated as a hierarchy of indexes fields or indices. For instance, NBO532 can be considered as the following hierarchy: NBO→5→32. In this view, globally, other potential nodes could potentially emanate from NBO at the $3^{rd}$ index level (e.g. NBO→5→41 or NBO→5→45). NBO532, NBO541 and NBO545 are child index of NBO5. Similarly, other potential nodes could potentially emanate from NBO at the $2^{nd}$ index level (e.g. NBO→4→28 or NBO→4→26). NBO→4→28 and NBO→4→26 are child index of NBO. This is a tree oriented implementation and globally the entire data structure is a forest of such trees where the root of each tree is a specific origin. The root has no parent index. The leaf has no children index also referred to as a child index.

More generally, hierarchically ordering the fields means that a hierarchy of fields is determined. This hierarchy is freely determined, preferably according to the queries that are expected. Hierarchically indexing the files as a tree of indexes means that each file can be placed in a tree according to the hierarchical ordered of its index.

For instance, with the above example the hierarchy of the filed related to the Origin is greater than the hierarchy of the field related to the trip type. Further, the hierarchy of the field related to the trip type is greater than the hierarchy of the filed related to the start week. For instance, as depicted in FIG. 3, the field related to the Origin, trip type and start week is hierarchically greater than the field related to the destination airport which is in turn hierarchically greater than the field related to the advance purchase category.

As to the hierarchical indexing of the files as a tree of indexes, the files are indexed according to their index with the same hierarchical order as the fields. The index NBO532 is for instance hierarchically greater than the following indexes NBO532+DXB, NBO532+KGL, NBO532+DXB+category0, NBO532+KGL+category0. In the tree of indexes, the file indexed with the index NBO532 is therefore closer to the root than the files indexed with the following indexes: NBO532+DXB, NBO532+KGL, NBO532+DXB+category0, NBO532+KGL+category0. Accordingly, the index NBO532+DXB is for instance hierarchically greater than the index NBO532+DXB+category0. Then, the file indexed with the index NBO532+DXB is therefore closer to the root than the file indexed with the following indexes: NBO532+DXB+category0. All these explanations related to hierarchical ordering of fields and hierarchical indexing of files appears clearly in the present description and figures.

According to another method of implementation, the indexes are flattened and the index is a composite—in the sense that NBO532 is treated as a single index without any hierarchy. This means NBO428 or NBO426 for example are no longer the hierarchic child of NBO, but are independently roots of other trees.

In between these two extremes methods the invention also provides the possibility of indexes where some parts of the entire chain of dimensions that the index structure represents (e.g. origin→trip-type→start-week→destination→advance-purchase→price→frequencyOfPrices) are a mix of hierarchic and flattened indices. This is index is referred to as a hybrid index. For example we may choose to represent origin→trip-type→start-week as a flattened index (e.g. NBO532), i.e., with no hierarchy and the remainder of the dimensions (e.g. destination and advance-purchase) as hierarchical. Or for example, we may choose (origin-trip-type) as flattened and the remainder (start-week→destination→advance-purchase) as hierarchical.

In general the hierarchic representation will consume more memory than the flattened one, but will be able to satisfy more diverse statistical queries. The contrary is true for the flattened index, which generally provides less flexibility but requires less memory. In any case, whichever method is used an index turns out to be a path in a tree or a degenerate path, i.e. in case of one dimension or one flattened composite dimension.

From the above it is clear that there are different permutational or combinatorial possibilities of choosing the hierarchical ordering of index trees, both in terms of the sequence of the dimensions as well as whether these elements are in hierarchical or flattened mode. Which hybrid index to be chosen depends on knowing the range of queries that the business application needs versus accommodating such requirements within reasonable memory requirements. Because every index that is part of the hierarchy indexes the possible index field values or bins of the next dimension, the key to reduce memory consists in knowing in advance what are the range of possible input file parameters in a dimension—infinite or finite, discrete or continuous. This affects the creation of indexes fields and bins impacting thereby the branching factor of the tree in a hierarchical index—a high branching factor will increase memory requirements. Also, we need to ask the question—does it make sense for the business to keep all possible input file parameters/index fields values of a dimension or to group them into bins for easier comprehension? Binning, discussed above with detailed examples for trip-type and advance purchase, reduces memory requirements by reducing the branching factor of the current dimension (e.g. trip-type) and reducing the combinatorial explosion effect on the branching factors of the dimensions that follow in the indexing scheme (e.g. start-week→destination→advance-purchase).

One natural question is that what values are outputted if someone sends a query corresponding to the index, say NBO532? What is outputted is a statistical container which contains a frequency distribution of the attributes, typically the prices, for all journeys that originated from NBO of trip-type 5 and start-week 32.

Thus a key aspect of the present invention is to create an associative data structure in memory that links this elaborate transportation service provider domain dependent data indexing scheme with its respective statistical containers—where these indexes are created and its respective statistical data containers are populated at the time of batch pre-processing. Data containers can be attached to these indexes at the levels of the chosen indexation and thus one can get statistics exactly for those value combinations of the indexes—amounting to user specified query. It is in this way that a variety of queries like "Where can I go from Nice" or "What are the prices to destinations from NCE on $32^{nd}$ week of the year" can be answered with extreme rapidity.

RAMS of multiple machines could be utilized to increase the speed, in particular if data volume does not fit in memory. If two different users need fast response time access to the same data then different indexes for them can be created in different index tables and be loaded onto distributed RAMs.

Figure 4:
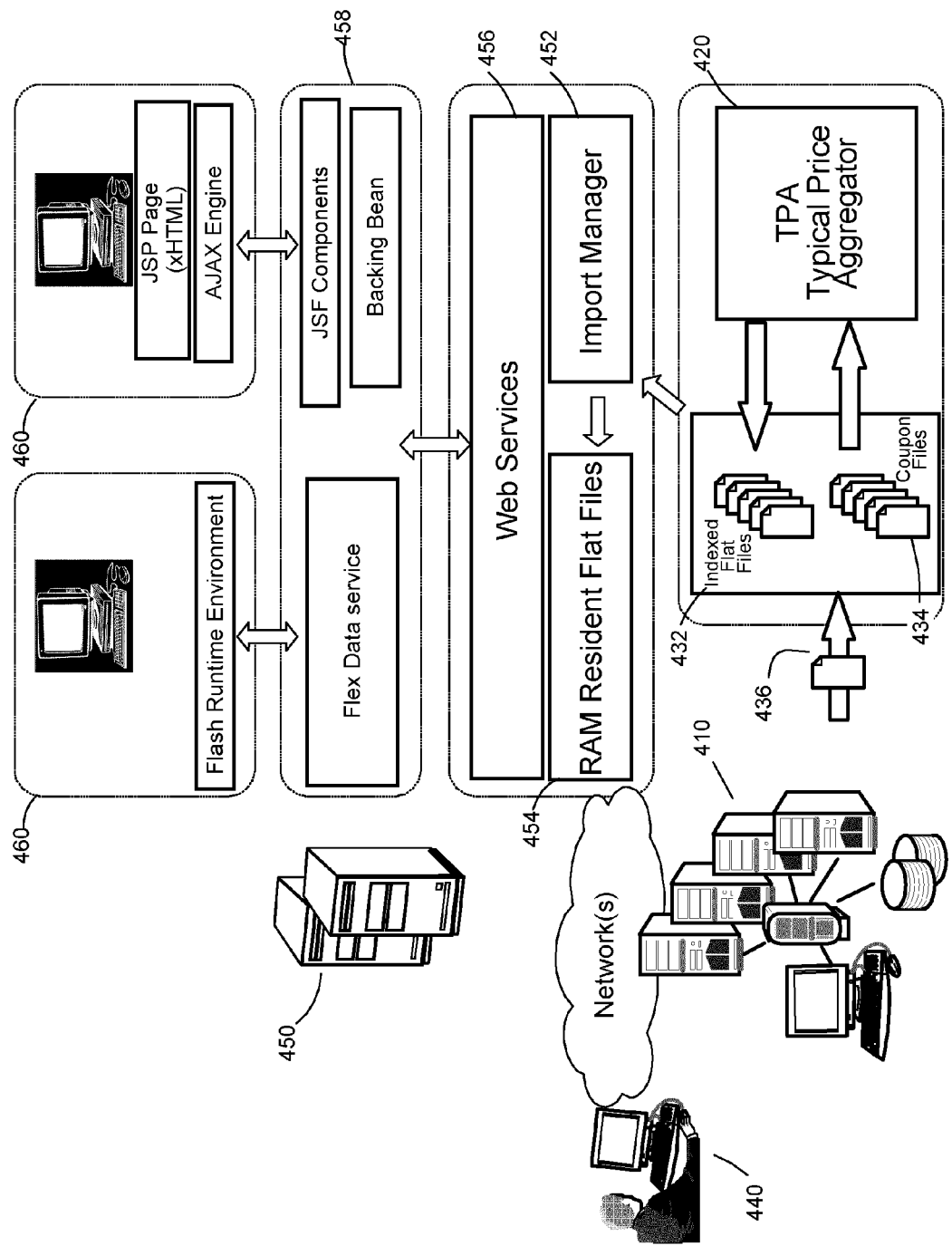
FIG. 4 shows the overall architecture of a system according to the invention allowing a fast indexing, retrieval and display of statistical data collected from a data warehouse.

FIG. 4 shows the overall architecture of a system according to the invention allowing a fast indexing, retrieval and display of statistical data collected from a data warehouse.

The application software implementing the invention is assumed to be run from a computerized platform 410. For example, from the large storing, computing and networking resources set up by a GDS to support its affiliated travel agencies, airlines and travel service providers. The software application is here referred to as typical price aggregator or TPA 420. It produces the files, 432 typically flat files of statistical data that are indexed as explained in the previous figures to allow a fast retrieval of the statistical containers. A file that is indexed is also referred to as an indexed file.

The incoming raw data on which the aggregator works are, in this exemplary implementation of the invention, the coupons files 434 that are for instance accumulated on a daily basis into the various databases run by the GDS to support its network of customers. Typically, coupons are booked by remotely connected travel agents 440 from affiliated travel agencies, airline travel offices in town or from airports, and also directly from travelers using online travel sites supported by the GDS.

The indexed flat files are updated at scheduled intervals, for example once a day, so that coupon files and any data necessary to generate the indexed flat files are downloaded 436 accordingly from the storing and computing facilities implementing the GDS data warehouse 410 where all daily transactions have been registered. They are stored in a repository 430 typically a FTP repository.

Typically, it takes eight minutes to index a one gigabyte data file, for instance on a single processor.

Once the indexed flat files have been generated and/or updated by the aggregator application 420 from the latest transferred coupon files they are stored in a repository and are imported 452 to be stored and processed by the computing resources of a server 450. The server is aimed at responding to the queries of the various end-users of aggregator application, e.g. the management team and professionals in charge of a company that need to gather statistical data from the data warehouse company and all regular travel agencies and customers when aggregator application is made available as a valuable tool to enhance the services offered by traditional travel online sites and traditional travel agencies.

Whoever are the end-users, the processing of their queries is done by implementing any of the standard software means that have been developed to carry out the traditional client/server model of the Internet. The end-users 460 are typically running one of the available client browsers on their terminal and personal computers so that they can communicate with the appropriate front-end application 458 of the server. The invention manages to keep the size of the data structure previously described small enough to fit entirely in the main memory of the server. Hence, the set of indexed flat files can stay permanently in the fast main memory 454 made of RAM (random access memory) in order to expedite the processing of the end-user queries through the web services layer 456.

Figure 5:
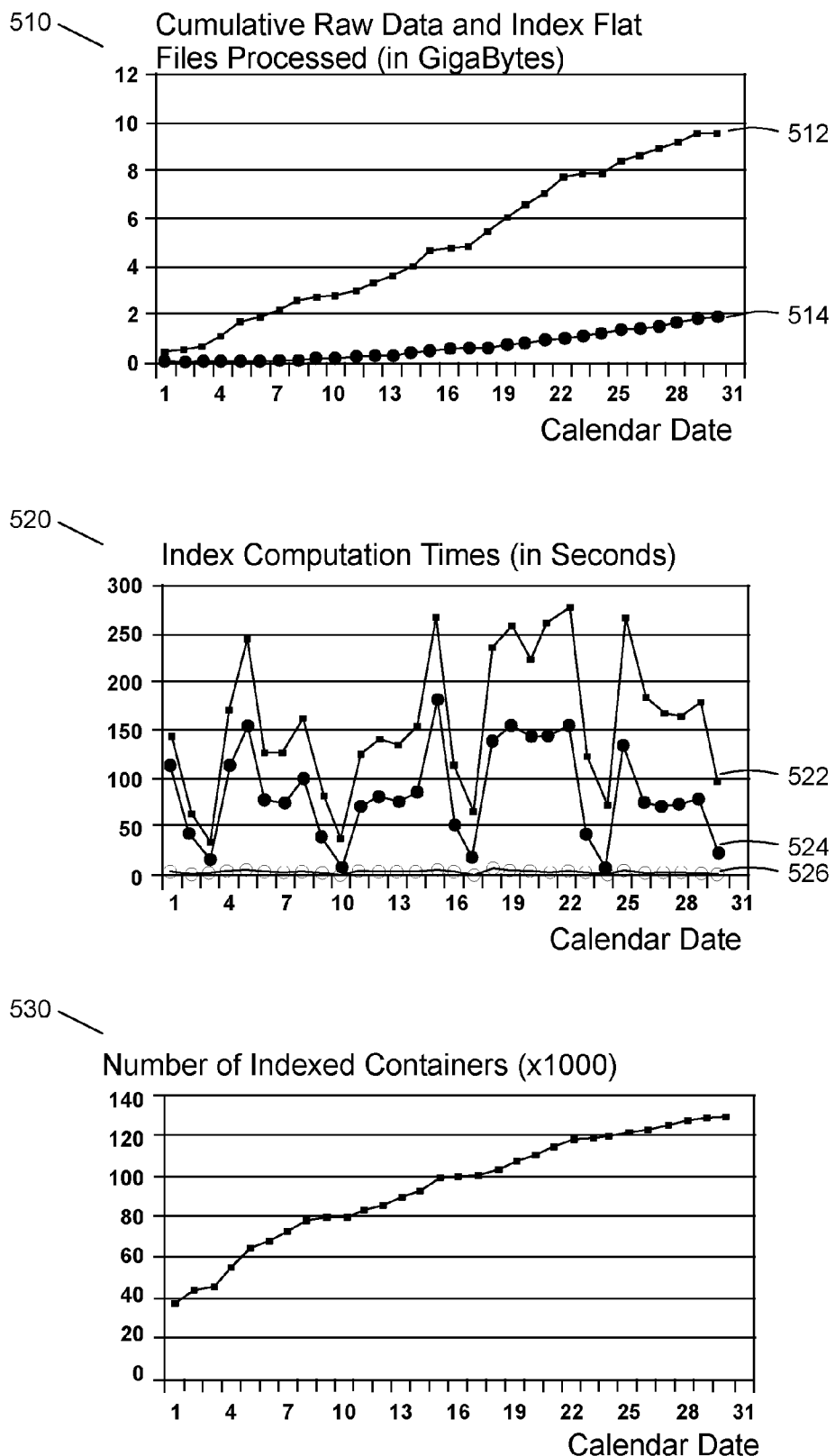
FIG. 5 discusses performances of a system according to the invention.

FIG. 5 discusses performances of the typical price aggregator.

The first diagram 510 shows the typical amount of data processed over one month of operation by the aggregator. It compares the amount of raw data processed, i.e., the overall size of the daily received coupon files accumulating over one month 512, versus the resulting size of the indexed flat files 514 computed. Hash tree storage grows at a pace of 118 Mb/month versus feed (coupon files) at 10 Gb/month. However, the plot shows that at the end of the month the processed data reaches 2 Gigabytes.

On a daily basis, the processing time of the incoming coupon files, the raw data, is typically what is shown by diagram 520. The overall processing time required by the aggregator application to index the flat files does not exceed one hour per month. On a daily basis, the total time required is represented by the upper curve 522. The intermediate curve 524 shows proportion of the total time that is spent in transforming the raw values of attributes to the index field bin values. Lower curve 526 shows the proportion of the total time used to compute and insert a path in the existing tree of indices.

Diagram 530 serves is the proof of the frequency distribution representation and its benefits. It shows that starting with an empty tree on the first day of processing as we process more and more data the slope of the number of containers (index paths in the tree) in the transformed dataset decreases. This is because at start of processing, when we have an empty tree a large number of new origin-destination-price paths which aren't there are vigorously added. With a small number of dimensions, soon these paths reach close to full coverage that is for the cross product of the number of origin cities times the number of destination cities times the number of possible start weeks times the number of possible trip types—thanks also to a small number of carefully selected business significant bins for trip type and start weeks only.

Thus, there are only few new containers to be added in the tree as we encounter more and more of data—rather more data is being added as frequency counts—a time of complete coverage comes when the slope is 0 degrees. While graph 530 shows the trend in the growth of containers for first time processing, in daily processing typically we would, see little or no growth in the number of containers—we will start a high level of containers and end with nearly the same level of containers—a completely flat growth curve. It means that if only frequency counts are incremented the file size will grow by miniscule amounts compared to the growth of the number of original data set records. This means that the file size will nearly be independent of the number of original data set records and thus can still be loaded in RAM even if there is a phenomenal growth in the number of records—this will be true as long as the number of dimensions is small.

As already mentioned the statistical containers involved by a change are not recomputed entirely each time a new piece of raw data is received i.e. received from the daily coupon files. To keep overall size of flat files low and to limit the processing time to what is shown in diagram 520 the statistical data are incrementally updated. There are known mathematical techniques to do this. A few are briefly recalled hereafter for the main statistical parameters:

| Parameter: | Incremental computation: | Conditions: |
|---|---|---|
| Mean: | $M_{n+1} = n.M_n + x_{n+1}/(n + 1)$ | Remember n and $M_n$ |
| Variance: | $V_{n+1} = V_n + (x_{n+1} + M_{n+1})^2 + n(M_{n+1}^2 - M_{n+1}$ $M_n^2 - M_{n+1}M_n)$ | computed first, $V_1 = 0$ |
| Standard Deviation: | $S_{n+1} = S_n + (x_{n+1} - M_n) * (x_{n+1} - M_{n+1})$ | $S_1 = 0$ |

This permits a seamless integration of each day's transaction into the range of data that should be available for use, the next day, without undoing the computation that was made until the previous day.

FIG. 6 discusses the incremental updating of the indexed files from the incoming raw data, i.e.: the coupon files.

At the end of the business day all ticketing transactions are added in batch to existing indexed tables. For exemplifying the case lets illustrate record addition in a much smaller scale and imagines that today is the $29^{th}$ of May 2007. The transactions for current day, in term of coupon files, are as shown 610.

The raw coupon file records 610 are reconstructed into tickets by a process resulting in individual ticket records. Two individual records 620 are shown 620. Each raw input file 610 and individual record 620 comprises an attribute (8000 KES, 25 USD) and input file parameters (NBO, KIS, BLM, 2007 Jul. 1, 2007 Jul. 2, 4 etc.). Each input file parameter corresponds to an index field (city of origin, city of destination, departure date, arrival date, type of travel, advance purchase group etc). The individual records 620 are not grouped yet on FIG. 6. For each individual record, the first field 621 is the ticket number; the fifth field 625 gathers most input file parameters and is a concatenated representation of all the hierarchical index fields: origin, trip type bin, start week, destination and advance purchase bin, all in this sequence.

Ticket records for each day are saved in separate files named by the date.

Whenever this ticket record is created it updates the primary indexes NBO027, NBO0**, NBO*27 and NBO*** if they exist. Since the master indexed table is already loaded in memory this takes O(1) or constant time. If any of the indexes do not exist they are created, just an additional record in the master indexed table. Depending on the internal implementation this may take O(1) time or O(log n) time where n is the number of records in the indexed table. Note that O(log n) time increases the time for index creation if it does not exist and has nothing to do with search and retrieval time.

Once the new or old table record is identified, then the embedded destination table is searched for key KIS which was also part of the original key. If that does not exist it is created, if it exists it is identified. This time is also O(1) or O(log n). As soon as the KIS key is identified the statistics record for all advance purchase categories is updated. This update also takes O(1) time due to moving average, moving standard deviation and moving percentile like mathematical formulas that are used for incremental update.

In the same hierarchical spirit, the last character of the original key 0 representing the advance purchase category is created or found. This time is also O(1) or O(log n), but in relation to the above O(log n) or O((log n)^2). The statistics in it are updated.

The finding of the right integer price bin for updating the frequency distribution is also possible in constant time. This is because the frequency distribution is also a table indexed by the prices. Also, prices are recorded with respect to currency of origin. The appropriate conversion is made. So, in this case, the first record had a price of 8000 KES (local currency of Kenya, Kenyan Shillings). If 8000 already exists in the frequency distribution its frequency is updated by incrementing the value by 1, else a new entry in the frequency distribution table is created with the key 8000 and a value of 1.

It is to be noticed that the size of the frequency distribution table is naturally controlled by the fares paid which in turn is dependent on the fare classes of the airline. For any given origin and destination this is a small number.

Typical index creation times 520 have already been shown in FIG. 5.

Since the ticket records constructed from the coupon files for each day are saved in separate files named by the date it is easy for an automated process to locate the records for a given date.

If, as mentioned earlier, records are kept just for one year this means that when the transactions are added for the 29$^{th}$ of May 2007 the records for the 29$^{th}$ of May 2006 must be deleted.

The delete process is exactly the reverse of the addition process. The ticket file for the 29$^{th}$ of May 2006 is located; each ticket is read into memory. Since the ticket 620 records the indices of the individual records, these embedded indexes are used to locate the grouped containers and their sub-containers. For the first record, in this case these indexes would be NBO027, then KIS, then 0 and then 8000. However unlike addition deletion has to progress bottom up from the deepest to the shallowest level, meaning first decreasing the frequency count of the 8000 frequency bin in the sub-container NBO027KIS0, then the general statistical updates in the 0 bin of NBO027KIS and then the general statistical updates for the NBO027KIS bin. All will take a O(1) time to be located and updated. If there is just once piece of data that was there in the 8000 bin, the 8000 frequency bin is not deleted just its count is reduced to 0. This optimization saves one O(log(n)) time insertion of a record during the addition process, should the 8000 frequency bin again occurs in the future. This also has the additional advantage that a search over records that has 0 count frequency bins, could also potentially indicate to the business user, any price changes between the previous years and the current year—this could in itself be a separate offline process that identifies annual changes to prices.

Finally, as a part of the deletion process, the embedded tables for NBO*27, NBO0 or NBO* have to be updated too.

In summary the invention comprises the following features:
  given a large volume of daily customer data (e.g.: airline coupons and ticketing records of passengers from a GDS) with each individual record having different fields (e.g.: booking date, depart date, origin, destination, price paid etc.);
  and a business need of being able to search and retrieve groups of accumulated data (rather than individual records) focusing on a single dimension (e.g.: prices paid) over a large period (e.g.: for a year) by a set of pre-determined criteria (e.g.: by advance purchase, type of trips, etc.) and their combinations that implies a data volume explosion to terabyte scale;
  and a further business need to provide a plurality of online statistical services over such terabyte scale data to different industry users (e.g.: airlines, travelers, travel agents);

the invention provides a technical solution:
  for efficient search oriented indexed storage of such data important to groups of industry users;
  that also permits each day's transaction data to be seamlessly integrated into the range of data that should be available for use, the next day, without undoing the computation that was made until the previous day;
  such that statistical results retrieval process to a query is nearly independent of the volume of data and is in the order of small number of milliseconds;
  where similar response times are guaranteed even for queries relating to ad-hoc parametric subsets of the distribution;
  with a display that allows easy visual comparison of the sub-distribution sets in user selectable ways.

Contrary to the prior art concerning data warehouse and data marts, the invention brings a much lighter and leaner approach than the one of relational databases typically used by these data repositories. Indeed, relational data bases bring with them too many features and computational and I/O overheads that are irrelevant to solve the business problems as discussed in the background section. The main differences are explained hereafter:
  First of all, relational databases enable retrieving each individual raw record. If users are interested only in general properties of certain groups or subgroups of data, computation at query time significantly increases response time. The invention proposes to identify business relevant groups and subgroups and pre-compute in large scale, the desired properties for them. This is one key characteristic of the invention that distinguishes itself from the relational database approach.
  The other reason that leads to distance the invention approach from relational databases is that, in the business environment considered, users only read this database in real time. Since there is no writing in real time. Then there is no need for the overhead of real time commit-rollback facilities as in relational databases.
  The third point taken into consideration by the invention with respect to relational databases is that, if data were stored in the optimally normalized-denormalized schemas of relational databases then, to answer queries, joins would be required. Since relational databases store millions, and even billions, of such raw records, the joins would become a much too large contributor to response time. In the scheme of the invention, all possible join results are pre-computed with index field values within business relevant parametric value ranges. To achieve it, as explained above, a technique of wildcard indexing is used.
  The fourth point considered is that standard relational databases, when queried, retrieve raw records from disk before computation over a group of records can even start. Modern I/O operations are still orders of magnitude slow compared to RAM machinery. Hence, making the data structure of the invention RAM resident, by maintaining file sizes below RAM limits, offers considerable speed benefits. This is achieved by working with groups and not raw records and by storing frequency distributions so that, at most, a few bytes are added per new record, resulting in a very small slope of increase of file sizes.
  Additionally, since the invention works with groups rather than atomic records (as opposed to what relational databases do) there is an incremental method to update each group of records during a batch process at day's end of business. Since query-able file sizes are kept much lower than limits, another copy of that file (not the one being queried) can easily be made. This file can be in a separate physical machine or in a second process receive all real time customer data updates to update its groups and subgroups without affecting user query response time in any way. This process can save the data to file at periodic intervals. At other specific periodic intervals, corresponding to the real time resolution required, or at times when a particular data subgroup is not under active query the second process can send updated packets to the file against which user queries are running.

As detailed previously, an online travel system according to the invention can greatly enhance traveler and travel agent ability to plan trip irrespective of travel parameters. Advantages of the invention over existing systems will be further highlighted through the following questions and responses:

Question: "I am a price sensitive leisure traveler, looking for the cheapest price on inflexible dates. How can travel system help me?"

Answer: "You might want to check if there are bookings made at the lower prices at an advance purchase date range which lies in the future. Travel system will show you whether some airlines in the past had opened up some of their low fare classes closer to your departure date (for example July 1$^{st}$, 2010) than you are today (assuming today's date is Dec. 18, 2009). This means that if you don't want to book now, travel system tells you when (maybe in 30 days before departure date, i.e.: starting on the 1st of June) you could resume your search and book to get these prices. Of course this cannot be guaranteed. However this assumption is based on historical data for prices actually paid by passengers. It is therefore very likely."

Question: "I am a price sensitive leisure traveler, looking for the cheapest price over flexible dates. How does travel system help me to know when to travel?"

Answer: "If you want to book now and your departure dates are flexible, simply, add the possible book-ahead periods on which the lowest prices were available to today and search for flights on those dates."

Question: "I am planning my vacation to Australia. I am not certain about dates or trip duration? What should be my air travel budget?"

Answer: "Just look up travel system with your origin and prices to some main cities that you want to visit. Get the median prices on different book-ahead dates to have your budget".

Question: "I am disappointed with bogus online ads during my travel search luring my clicks through tempting and unusually low ticket prices which I can never find on such sites, thus wasting my time. How can travel system help me?"

Answer: "Travel system is able to show you the entire price range of tickets between an origin and destination by trip type, by different advance purchase periods and for specific departure weeks of a whole year. This means you have prices (inclusive of taxes) of all fare classes of all airlines operating in that origin and destination. This means also that before beginning your real time fare search, if you look at a travel system according to the invention you already know what to expect. Chances are less for you to be lured unreasonably. In addition, by seeing the booking frequencies you are able to have: an idea of the consumer market, not only of the supply side but also the demand side (who are booking what). Moreover, you get an idea of when is a good time to search and book (lower prices) versus when it is not, without necessarily assuming that you want to book now."

While there is shown and described the present preferred embodiment of the invention, it is to be distinctly understood that this invention is not limited thereto but may be variously embodied to practice within the scope of the following claims.

The invention claimed is:

1. A method for providing statistical data relating to a plurality of input files from a data warehouse, the method comprising:
   defining a plurality of index fields, each index field being associated to a parameter of the input files and configured to accept an index field value from a predefined value domain associated to the index field;
   hierarchically ordering the index fields;
   defining a plurality of bins, each bin being associated to one of the index fields and gathering one or more index field values from the predefined value domain for the index field;
   creating a lookup table that includes a plurality of data structures by, for each data structure:
      defining a primary key and at least one secondary key by concatenating one or more bins in compliance with a hierarchy of the hierarchically ordered index fields to form a sequence of bins, the lookup table comprising only one primary key per data structure,
      hierarchically indexing the data structure using the primary key and the at least one secondary key, each key having one or more child keys, and having at most one parent key so that each child key defines an index that comprises the same sequence of bins as the index defined by its parent key plus at least one additional bin associated to the child key, and
      providing each index with a data container configured to store statistical data within the data structure, the data container being bounded by the key that defines the index and a next occurring key, so that each data container is indexed and is directly addressable from within the lookup table based on the hierarchically indexed data structures;
   in response to receiving the input files, updating the data containers of the data structures with the input files, the updating including, for each input file:
      identifying and extracting from the input file at least one attribute to be analyzed through statistics and one or more input file parameters characterizing the at least one attribute,
      creating at least one individual record from the input file, each individual record comprising the at least one attribute and the one or more input file parameters characterizing the at least one attribute,
      associating each input file parameter with at least one index field,
      establishing a correspondence between each input file parameter and each bin associated with the at least one index field associated to that input file parameter,
      identifying the data containers indexed with the one or more bins that correspond to each input file parameter of the at least one individual record, and
      incrementally updating the identified data containers with the at least one attribute of the at least one individual record to obtain statistical data describing the at least one attributes;
   receiving a query;
   identifying in the query one or more query fields each associated with a query field value;

establishing a correspondence between each query field and an index field;

establishing a correspondence between each query field value and a bin of each index field corresponding to the one or more identified query fields to define bins corresponding to the query;

searching and identifying a relevant data container indexed with an index that comprises the bins corresponding to the query, wherein the relevant data container is associated with statistical data; and retrieving and sending to the user the statistical data associated with the relevant data container, wherein an elapsed time to retrieve the statistical data associated with the relevant data container is independent of the volume of the relevant data container.

2. The method of claim 1 wherein the statistical data describing the at least one attribute relates to a frequency distribution of the attribute, measures of a central tendency of the frequency distribution of the attribute, or measures a dispersion of the frequency distribution of the attribute.

3. The method of claim 2 wherein the statistical data is related to prices paid by travelers for transportation services.

4. The method of claim 1 wherein the parameters of the index fields are associated to include a city of origin, a country of origin, a geographical area of origin, a city of destination, a country of destination, a geographical area of destination, a cultural destination, a sport activity, a gastronomy, a wildlife observation, an entertainment, a departure date by exact departure date, a departure period by month, a departure period by week, a return date by exact date, a return period by month, a return period by week, a duration of the trip after arrival, or an advance purchase category.

5. The method of claim 1 wherein at least one index having no parent index is created for at least one data structure by concatenating at least two bins.

6. The method of claim 5 wherein the at least one index includes a bin associated to an index field related to the city of origin, a bin associated to an index field related to the duration of the trip before departure, and a bin associated to an index field related to the week of departure of a flight.

7. The method of claim 1 wherein at least one index having no parent index and that comprises only one bin is created for at least one data structure.

8. The method of claim 1 wherein at least one input file is an electronic ticket of a transportation service and comprises a coupon embodying all information for a segment of the transportation.

9. The method of claim 1 wherein a single index field value can be associated to a plurality of index fields.

10. The method of claim 1 wherein creating the at least one individual record comprises:

assigning a date, a week, a month, a semester, or a year to each individual record in response to the reception of the input file; and storing the at least one individual record in a memory.

11. The method of claim 1 wherein incrementally updating the identified data containers with the at least one attribute of the at least one individual record comprises:

creating batches of individual records, each batch containing individual records having the same dates or having the same date periods; and updating the data containers by batch of individual records.

12. The method of claim 1 wherein incrementally updating the identified data containers comprises:

incrementally computing updated statistical data from previously computed statistical data and from the at least one attribute of the at least one individual record.

13. The method of claim 1 wherein the data container is identified for an update by the input file if the index associated to the data container includes a number of bins that is equal or inferior to the number of input file parameters of the input file and each of the number of bins corresponds to at least one of the one or more input file parameters.

14. The method of claim 1 further comprising:

if at least one of the one or more input file parameters of the at least one individual record is associated to an existing index field but does not correspond to any bins of the sequence of bins, then:

creating an additional bin for the associated existing index field;

creating an additional data container indexed by the additional bin; and updating the additional data container with the at least one individual record.

15. The method of claim 1 further comprising:

if each of the one or more input file parameters of the at least one individual record corresponds to a bin but there is a combination of one or more bins corresponding to the one or more input file parameters that does not correspond to an index, then:

creating an additional data container indexed with the combination of one or more corresponding bins; and updating the additional data container with the at least one individual record.

16. The method of claim 1 wherein all data stored in data containers is stored under the form of flat files.

17. The method of claim 1 wherein at least one bin of the sequence of bins gathers all possible index field values accepted by the index field associated to the at least one bin.

18. A system for providing statistical data relating to a plurality of input files from a data warehouse, the system comprising:

a processor; and a memory coupled to the processor and including instructions that, when executed by the processor, cause the system to:

define a plurality of index fields, each index field being associated to a parameter of the input files and configured to accept an index field value from a predefined value domain associated to the index field;

hierarchically order the index fields;

define a plurality of bins, each bin being associated to one of the index fields and gathering one or more index field values from the predefined value domain for the index field;

create a lookup table that includes a plurality of data structures by, for each data structure:

defining a primary key and at least one secondary key by concatenating one or more bins in compliance with the hierarchy of hierarchically ordered index fields to form a sequence of bins, the lookup table comprising only one primary key per data structure, hierarchically indexing the data structure using the primary key and the at least one secondary key, each key having one or more child keys, and having at most one parent key so that each child key defines an index that comprises the same sequence of bins as the index defined by its parent key plus at least one additional bin associated to the child key, and providing each index with a data container configured to store statistical data within the data structure, the data container being bounded by the key that defines the index and a next occurring key, so that each data container is indexed and is directly addressable from within the lookup table based on the hierarchically indexed data structures;

in response to receiving the input files, update the data containers of the data structures with the input files, the update including, for each input file:

identifying and extracting from the input file at least one attribute to be analyzed through statistics and one or more input file parameters characterizing the at least one attribute, creating at least one individual record from the input file, each individual record comprising the at least one attribute and the one or more input file parameters characterizing the at least one attribute, associating each input file parameter with at least one index field, establishing a correspondence between each input file parameter and each bin associated with the at least one index field associated to that input file parameter, identifying the data containers indexed with the one or more bins that correspond to each input file parameter of the at least one individual record, and incrementally updating the identified data containers with the at least one attribute of the at least one individual record to obtain statistical data describing the at least one attribute;

receiving a query relating to the statistical data;

identifying in the query one or more query fields each associated with a query field value;

establishing a correspondence between each query field and an index field;

establishing a correspondence between each query field value and a bin of each index field corresponding to the one or more identified query fields to define bins corresponding to the query;

searching and identifying a relevant data container indexed with an index that comprises the bins corresponding to the query, wherein the relevant data container is associated with statistical data; and retrieving and sending to the user the statistical data associated with the relevant data container, wherein an elapsed time to retrieve the statistical data associated with the relevant data container is independent of the volume of the relevant data container.

19. The system of claim 18 wherein the data container is identified for an update by the input file if the index associated to the data container includes a number of bins that is equal or inferior to the number of input file parameters of the input file and each of the number of bins corresponds to at least one of the one or more input file parameters.

20. The system of claim 18 wherein the instructions further cause the system to:

if at least one of the one or more input file parameters of the at least one individual record is associated to an existing index field but does not correspond to any bins of the sequence of bins, then:

create an additional bin for the associated existing index field;

create an additional data container indexed by the additional bin; and update the additional data container with the at least one individual record.

21. The system of claim 18 wherein the instructions further cause the system to:

if each of the one or more input file parameters of the at least one individual record corresponds to a bin but there is a combination of one or more bins corresponding to the one or more input file parameters that does not correspond to an index, then:

create an additional data container indexed with the combination of one or more corresponding bins; and update the additional data container with the at least one individual record.

22. A computer program product for providing statistical data relating to a plurality of input files from a data warehouse, the computer program product comprising a non-transitory computer readable storage medium including computer readable code configured to cause at least one microprocessor to:

define a plurality of index fields, each index field being associated to a parameter of the input files and configured to accept an index field value from a predefined value domain associated to the index field;

hierarchically order the index fields;

define a plurality of bins, each bin being associated to one of the index fields and gathering one or more index field values from the predefined value domain for the index field;

create a lookup table that includes a plurality of data structures by, for each data structure:

defining a primary key and at least one secondary key by concatenating one or more bins in compliance with a hierarchy of the hierarchically ordered index fields to form a sequence of bins, the lookup table comprising only one primary key per data structure, hierarchically indexing the data structure using the primary key and the at least one secondary key, each key having one or more child keys, and having at most one parent key so that each child key defines an index that comprises the same sequence of bins as the index defined by its parent key plus at least one additional bin associated to the child key, and providing each index with a data container configured to store statistical data within the data structure, the data container being bounded by the key that defines the index and a next occurring key, so that each data container is indexed and is directly addressable from within the lookup table based on the hierarchically indexed data structures;

in response to receiving the input files, update the data containers of the data structures with the input files, the updating including, for each input file:

identifying and extracting from the input file at least one attribute to be analyzed through statistics and one or more input file parameters characterizing the at least one attribute, creating at least one individual record from the input file, each individual record comprising the at least one attribute and the one or more input file parameters characterizing the at least one attribute, associating each input file parameter with at least one index field, establishing a correspondence between each input file parameter and each bin associated with the at least one index field associated to that input file parameter, identifying the data containers indexed with the one or more bins that correspond to each input file parameter of the at least one individual record, and incrementally updating the identified data containers with the at least one attribute of the at least one individual record to obtain statistical data describing the at least one attributes;

receiving a query;

identifying in the query one or more query fields each associated with a query field value;

establishing a correspondence between each query field and an index field;

establishing a correspondence between each query field value and a bin of each index field corresponding to the one or more identified query fields to define bins corresponding to the query;

searching and identifying a relevant data container indexed with an index that comprises the bins corresponding to the query, wherein the relevant data container is associated with statistical data and retrieving and sending to the user the statistical data associated with the relevant data container, wherein an elapsed time to retrieve the statistical data associated with the relevant data container is independent of the volume of the relevant data container.

* * * * *

UNITED STATES PATENT AND TRADEMARK OFFICE
CERTIFICATE OF CORRECTION

| | | |
|---|---|---|
| PATENT NO. | : 9,710,506 B2 | Page 1 of 1 |
| APPLICATION NO. | : 13/979699 | |
| DATED | : July 18, 2017 | |
| INVENTOR(S) | : Gourab Nath | |

It is certified that error appears in the above-identified patent and that said Letters Patent is hereby corrected as shown below:

In the Claims

Column 26, Claim 1, Line 64, change "attributes" to --attribute--

Column 31, Claim 22, Line 11, change "attributes" to --attribute--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*